United States Patent
Hoelzl et al.

(10) Patent No.: US 10,735,053 B2
(45) Date of Patent: Aug. 4, 2020

(54) BOOSTED NEAR FIELD COMMUNICATION DEVICE

(71) Applicant: Infineon Technologies AG, Neubiberg (DE)

(72) Inventors: Juergen Hoelzl, Graz (AT); Walther Pachler, Graz (AT); Josef Gruber, St. Ruprecht an der Raab (AT)

(73) Assignee: Infineon Technologies AG, Neubiberg (DE)

( * ) Notice: Subject to any disclaimer, the term of this patent is extended or adjusted under 35 U.S.C. 154(b) by 256 days.

(21) Appl. No.: 15/605,998

(22) Filed: May 26, 2017

(65) Prior Publication Data

US 2017/0346533 A1   Nov. 30, 2017

(30) Foreign Application Priority Data

May 27, 2016   (DE) .................. 10 2016 109 779

(51) Int. Cl.
*H04B 5/02* (2006.01)
*H04B 5/00* (2006.01)

(52) U.S. Cl.
CPC ............. *H04B 5/02* (2013.01); *H04B 5/0031* (2013.01); *H04B 5/0068* (2013.01)

(58) Field of Classification Search
CPC ....... H04B 5/02; H04B 5/0031; H04B 5/0068
See application file for complete search history.

(56) References Cited

U.S. PATENT DOCUMENTS

| 8,903,312 B2 | 12/2014 | Haverinen |
| 2006/0229113 A1 | 10/2006 | Rowse |
| 2009/0303009 A1* | 12/2009 | Itasaki ................. H04Q 9/00 340/10.1 |

(Continued)

FOREIGN PATENT DOCUMENTS

| CN | 101147114 A | 3/2008 |
| CN | 102576416 A | 7/2012 |
| CN | 105264786 A | 1/2016 |

OTHER PUBLICATIONS

Chinese Search Report issued for corresponding application No. 2017103795377, dated Dec. 17, 2018, 2 pages (for informational purpose only).

*Primary Examiner* — Yuwen Pan
*Assistant Examiner* — Fatuma G Sherif
(74) *Attorney, Agent, or Firm* — Viering, Jentschura & Partner mbB (57) ABSTRACT

A boosted near field communication device includes an electronic circuit, a transceiver circuit, an interface coupling the electronic circuit with a host controller, and a memory containing a first information about an activation characteristic of the electronic circuit. The transceiver circuit is configured to determine a timing requirement of a reading device based on one or more request signals, activate the electronic circuit with energy obtained at least one of from an electromagnetic field generated by the reading device or from a battery on receiving a request signal from the reading device, and ensure that after activating the electronic circuit, the electronic circuit can receive and process a request signal from the reading device corresponding to the determined timing requirement by using the determined timing requirement and the first information about an activation characteristic.

20 Claims, 5 Drawing Sheets

(56) References Cited

U.S. PATENT DOCUMENTS

| | | | |
|---|---|---|---|
| 2010/0009627 A1* | 1/2010 | Huomo | H04B 5/0031 455/41.1 |
| 2012/0100804 A1 | 4/2012 | Miles | |
| 2013/0295843 A1* | 11/2013 | Tian | H04B 5/00 455/41.1 |
| 2014/0218080 A1* | 8/2014 | Choke | H03L 7/083 327/148 |
| 2014/0368050 A1 | 12/2014 | Chun et al. | |

\* cited by examiner

BOOSTED NEAR FIELD COMMUNICATION DEVICE

CROSS-REFERENCE TO RELATED APPLICATION

This application claims priority to German Patent Application Serial No. 10 2016 109 779.9, which was filed May 27, 2016, and is incorporated herein by reference in its entirety.

TECHNICAL FIELD

Various embodiments relate generally to a boosted near field communication device, methods for operating a boosted near field communication device and a communication device.

BACKGROUND

A growing number of applications use near field communication (NFC) devices. For example, NFC devices are used in ticket- and payment-systems, for logistics, in smartphones, smartwatches and smartbands. NFC devices have to meet a variety of requirements. The power consumption should be low in an active mode as well as in a sleep mode. Also, communication between one or more devices should be ensured or possible even if a device is not working according to international standards or may be damaged.

SUMMARY

A boosted near field communication device includes an electronic circuit, a transceiver circuit, an interface coupling the electronic circuit with a host controller, and a memory containing a first information about an activation characteristic of the electronic circuit. The transceiver circuit is configured to determine a timing requirement of a reading device based on one or more request signals, activate the electronic circuit with energy obtained at least one of from an electromagnetic field generated by the reading device or from a battery on receiving a request signal from the reading device, and ensure that after activating the electronic circuit, the electronic circuit can receive and process a request signal from the reading device corresponding to the determined timing requirement by using the determined timing requirement and the first information about an activation characteristic.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

An aspect of this disclosure may be seen in providing a boosted NFC device which may ensure a communication with another device which may be malfunctioning or not function according to international standards. An aspect of this disclosure may be seen in providing a boosted NFC device which may ensure a communication with another device although the wake-up characteristic of the boosted NFC device does not meet the timing requirements of a reading device, for example.

Ensuring a communication may be implemented by comparing an activation characteristic, e.g. a start-up/wake-up time duration of one or more components of the boosted NFC device, with the timing requirements of the other device and choosing if, when and how the boosted NFC device will answer a signal, e.g. a request signal, from the other device.

Another aspect of this disclosure may be seen in providing a boosted NFC device which lowers the power consumption of the boosted NFC device by allowing a power-off/deep sleep mode of at least one of its components but still ensuring a communication with other devices.

Figure 1:
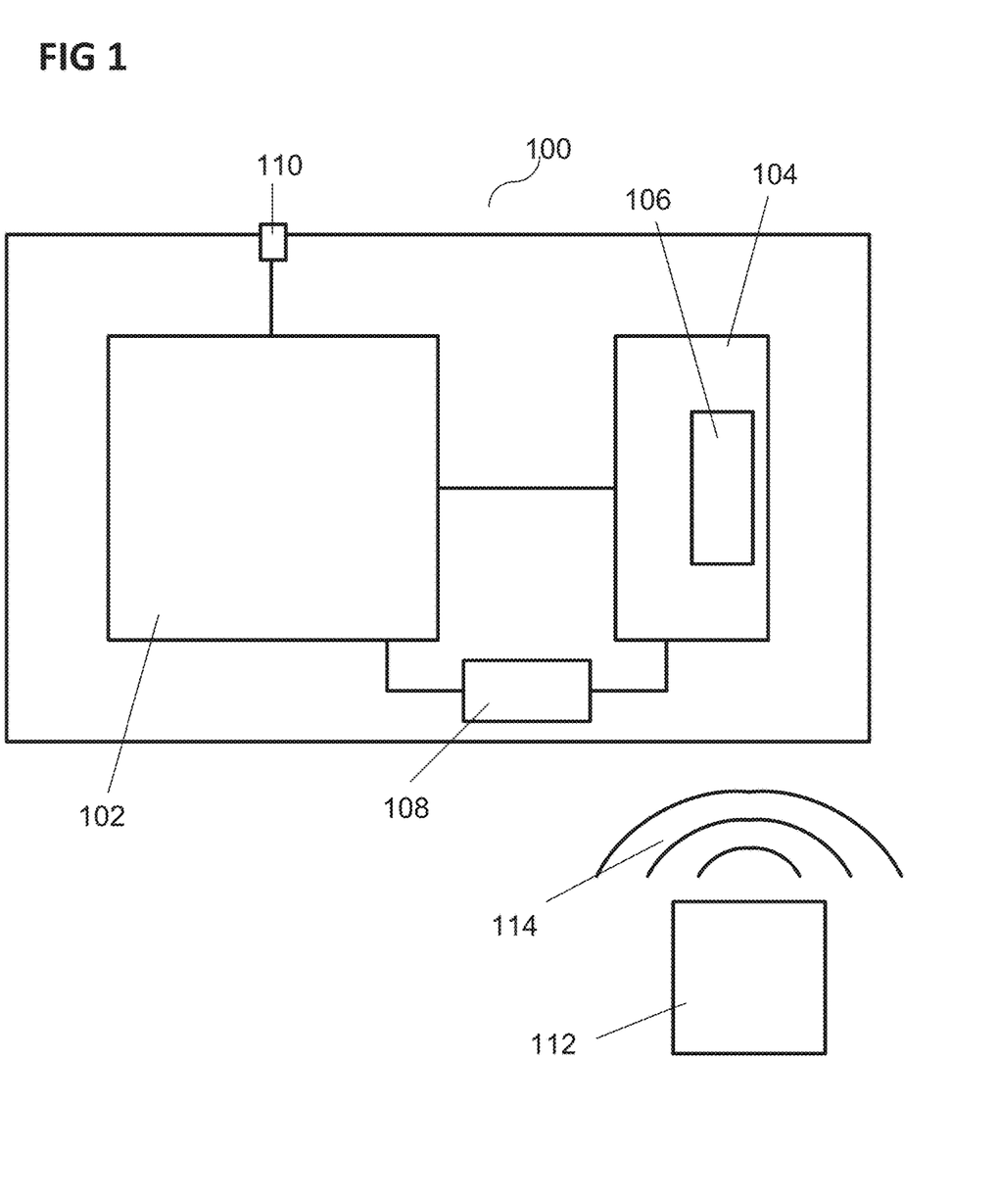
FIG. 1 shows an embodiment of a boosted NFC device.

FIG. 1 schematically shows an embodiment of a boosted NFC device 100.

The boosted NFC device 100 may include an electronic circuit 102 and a transceiver circuit 104 coupled to the electronic circuit 102. The transceiver circuit 104 may include an antenna(e) 106. The boosted NFC device 100 may include a memory 108 which may be coupled to the electronic circuit 102 and/or the transceiver circuit 104 and an interface 110 which may be coupled to the electronic circuit 102. The boosted NFC device 100 may be configured to communicate or transfer data and energy from and/or to a reading device 112 via an electromagnetic field 114.

The boosted NFC device 100 may be a separate device or coupled to another device, e.g. a communication device, or be a part of or a module of another communication device. The boosted NFC device 100 may use/receive energy to power one or more electronic components of the boosted NFC device 100 by a host controller (not shown) and/or by an electromagnetic field 114. The boosted NFC device 100 may be an active or a semi-active/semi-passive NFC device. One or more components of the boosted NFC device 100 may be implemented on one or more integrated circuits, e.g. a semiconductor chip.

The electronic circuit 102 may be implemented as or include one or more integrated circuits. For example, the electronic circuit 102 may be a secure element. The electronic circuit 102 may be configured to transfer and/or process data received via the antenna(e) 106 and the host controller (not shown). The electronic circuit 102 may be configured to forward data from the host controller (or from a host device via the host controller) to send the data via the antenna(e) 106 and/or forward data received via the antenna (e) 106 to the host controller and may be configured to process and/or not process the data in a such forwarding process.

The electronic circuit 102 may operate in a plurality of different modes. The electronic circuit 102 may have a powered-off mode, a sleep mode, an active mode and a reduced active mode which may be characterized in the energy consumption of the electronic circuit 102.

The memory 108 may be part of or partially integrated into the electronic circuit 102 and/or the transceiver circuit 104. The memory 108 may be coupled to the electronic circuit 102 and/or the transceiver circuit 104. The memory may include one or more programmable logic circuits, SRAM-Elements, Flash memories and/or other registers.

The interface 110 may be configured to transfer data and/or energy from the host controller to the electronic circuit 102 and/or from the electronic circuit 102 to the host controller. The interface 110 may at least partially be integrated into the electronic circuit 102. The interface 110 may include or include one or more interfaces according to ISO/IEC 7816, Single Wire Protocol (SWP) and/or an interface according to Inter-Integrated Circuit (I²C) technology. The boosted NFC device 100 may also be configured to transfer data and/or energy from the host controller to the transceiver circuit 104 and/or from the transceiver circuit 104 to the host controller via a coupling between the transceiver circuit 104 and the electronic circuit 102. In an alternative embodiment, the transceiver circuit 104 may include a separate second interface (or is coupled to a separate second interface) to transfer data and/or energy from/to the host controller. The host controller may be configured to at least partially control, regulate, modify and/or configure the electronic circuit 102, the transceiver circuit 104 and/or the memory 108.

The reading device 112 may emit an electromagnetic field 114. Via the electromagnetic field 114, the reading device may be configured to transfer energy and/or data from/to the boosted NFC device.

The transceiver circuit 104 may be or include the antenna (e) 106, e.g. for receiving the electromagnetic field 114 and/or for sending data. For example, the transceiver circuit 104 may be an automatic contactless frontend circuit. The boosted NFC device 100 may include one or more interfaces to couple the transceiver circuit 104 with the electronic circuit 102 for transferring data and/or energy. For example, an interface between the transceiver circuit 104 and the electronic circuit 102 may include an Active Contactless Bridge (ACLB) and/or a Digital Contactless Bridge (DCLB), e.g. the electronic circuit 102 may include an ACLB and/or DCLB master or slave circuit and the transceiver circuit 104 may include an ACLB and/or DCLB master or slave circuit.

The transceiver circuit 104 may be configured to receive one or more request signals from the reading device 112, e.g. via the electromagnetic field 114. The transceiver circuit 104 may be configured to determine a timing requirement of the reading device. Also, the transceiver circuit 104 may be configured to activate the electronic circuit 102 with energy obtained from the electromagnetic field 114 and ensure that the electronic circuit 102 may receive and/or process a (e.g. following) request signal. This may include that the transceiver circuit 104 may compare the information of an activation characteristic of the electronic circuit stored in the memory 108 and the determined timing requirement of the reading device 112 and based on this comparison activate the electronic circuit 102 to answer a first request signal or a following second request signal (or more following request signals).

Figure 2:
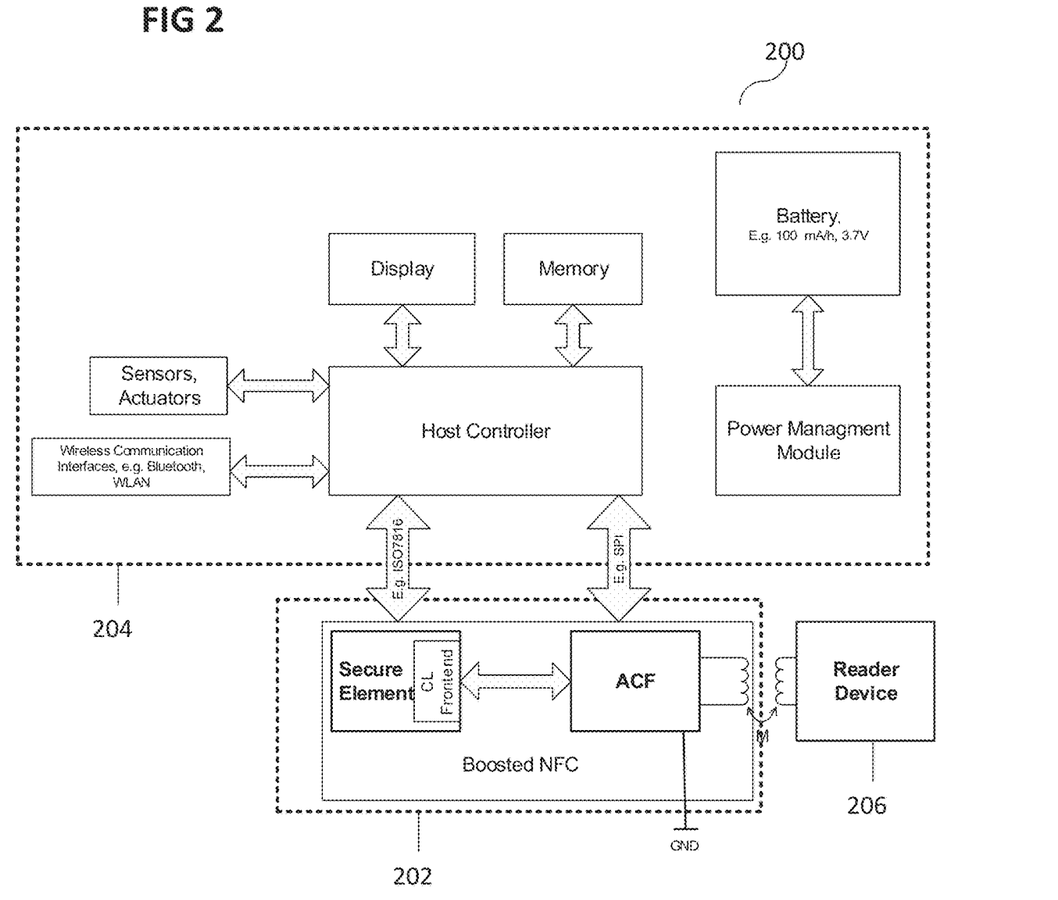
FIG. 2 shows an embodiment of a system with a boosted NFC device.

FIG. 2 schematically shows an embodiment of a system 200 with a boosted NFC device 202.

The system 200 may include the boosted NFC device 202, a host system 204 and a reading device 206.

The host system 202 may be an electronic device, e.g. a communication device. The host system 202 may be a portable device with one or more microprocessors and/or micro controllers, e.g. application processors. For example, the host system 202 may be or include a mobile telephone, smartphone, smartband, smartwatch, PDA, tablet, tablet-computer, notebook, laptop, headset (e.g. for virtual reality/augmented reality applications) and/or a wearable (e.g. worn on a body of a person like electronic devices integrated into clothing/textiles). The host system 202 may include a display, a memory, one or more sensors, and one or more actuators. The host system 202 may be configured for communication according to WLAN, Bluetooth or other wireless communication standards or tethered communication standards.

The host system 202 may include the host controller which may be coupled via one or more interfaces to the boosted NFC device 202. For example, the host controller may be independently coupled to an electronic circuit, e.g. a secure element, and/or coupled to a transceiver circuit, e.g. an automatic contactless frontend (ACF). The host controller may be also coupled (not shown) to the power management module and/or the battery.

The boosted NFC device 202 may be configured to transfer data and/or energy from/to the reading device via an electromagnetic field.

Figure 3A:
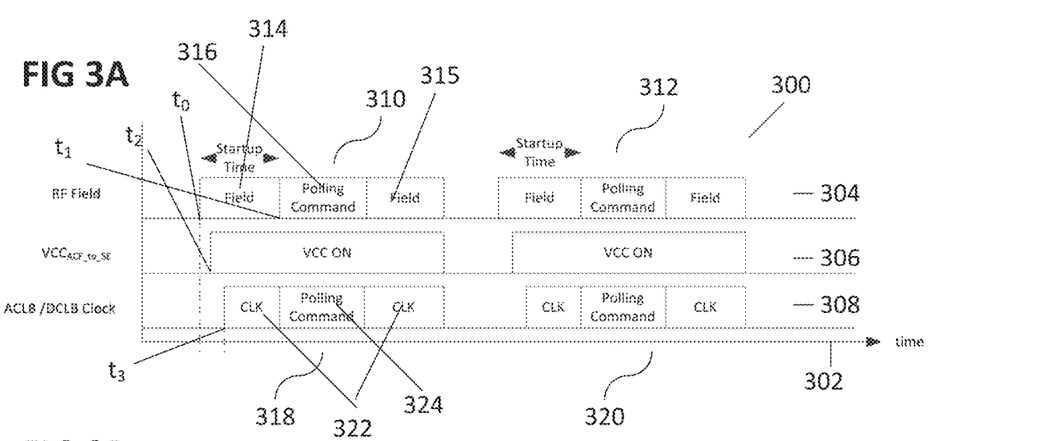
FIGS. 3A to 3C show signal timings.

FIG. 3A schematically shows a signal timing of a boosted NFC device in a diagram 300.

The diagram 300 schematically shows signals and voltages corresponding to a horizontal time axis 302. In this example, a transceiver circuit is implemented as an ACF (Active Contactless Frontend) and an electronic circuit is implemented as a secure element (SE). Furthermore, in this example, an interface/coupling of the electronic circuit and the transceiver circuit is implemented via an Active Contactless Bridge (ACLB) bus and/or a Digital Contactless Bridge (DCLB) bus. However, in other embodiments, the transceiver circuit, the electronic circuit and/or the interface/coupling between the transceiver circuit and the electronic circuit may be implemented in a different manner, respectively, and the diagram 300 may still apply in general. The same principle also applies to FIG. 3B and FIG. 3C.

A first row labeled "RF Field" 304 illustrates the timing of transmission of signals sent from a reading device. In this example, the reading device sends two request signals (also referred to as request messages) 310, 312. A request signal may include three signal periods 314, 315, 316 of respective time durations. In a first signal period 314 of a first time duration, an electromagnetic field, emitted by the reading device, is active. In a second signal period 316 (which may immediately succeed the first signal period 314) of a second time duration, an electromagnetic field is also active and data, e.g. a polling command, may be sent from the reading device. In a third signal period 315 of a third time duration (which may be the same as the first time period 314), an electromagnetic field, emitted by the reading device, is active. In more detail, a first request 310 signal (which may include the first signal period 314, the second signal period 316, and the third signal period 315) may be transmitted from the reading device to the boosted NFC device. To implement the transmission, the electromagnetic field starts at a time $t_0$ and sending of the data (e.g. the polling command) starts at a time $t_1$. The time duration between $t_0$ and $t_1$ may be referred to as startup time $t_{startup}$.

A second row labeled as $VCC_{ACF\_to\_SE}$ 306 shows a timing of a supply voltage VCC supplied by the ACF to the SE. In this example, the ACF may receive the electromagnetic field emitted by the reading device and may supply energy obtained (in other word extracted) from the received electromagnetic field to the SE. As shown in the diagram 300, due to the signal processing/transfer delay characteristic of hardware, firmware and/or software of one or more interfaces (or other components) provided in the signal path from the ACF to the SE and e.g. due to hardware, firmware and/or software of the ACF and/or the SE a time delay may be caused until the supply voltage VCC may be turned on. This is shown in the diagram 300 in the second row, where the voltage $VCC_{ACF\_to\_SE}$ may be turned on (in other words be on "high" level) at a time $t_2$, which is different from the time $t_0$ by the respective time delay ($t_2-t_0$).

A third row labeled as ACLB/DCLB Clock 308 shows two response signals 318, 320 sent from the SE in reaction to the received two request signals 310, 312 from the reading device, respectively. The two response signals 318, 320 may be sent via the ACF to the reading device. In this example, a response signal 318, 320 may include two clock signals 322 and a data signal 324 (labeled as polling command). As shown in the diagram, due to hardware, firmware and/or software of the ACF and/or the SE another time delay may be present and the first response signal 318 may begin at a time $t_3$ which is different to the time $t_0$ and the time $t_1$, respectively.

A delay time $t_{delay}=t_0-t_3$ may be an important factor for the question if a boosted NFC device is able to answer a request signal 310, 312 or not. If the reading device does not implement a time $t_{startup}$ which is long enough to power a boosted NFC device and prepare the boosted NFC device for receiving and/or processing the respective request signal 310, 312 from the reading device (starting from a sleep mode of one or more components of the boosted NFC device, for example), a communication between the reading device and the boosted NFC device may not be possible or may be erroneous (e.g. time delays, loss of data, and the like, may occur). By way of example, a typical startup time $t_{startup}$ of the reading device may be implemented in the range of about 5 ms. A software of the SE may need up to about 2 ms to 4 ms to be ready to receive a request signal 310, 312 (when being in a sleep mode) and process the request signal 310, 312. Thus, a startup time $t_{startup}$ may only have a small window for a lower value.

The ACF may be coupled to or may include a memory in which an information about a first delay time $t_{delay}$ and an information about a second delay time $t_{delay}$ is stored. The first delay time $t_{delay}$ may correspond if the SE is powered by the electromagnetic field of the reading device. The second delay time $t_{delay}$ may correspond if the SE is powered by the host controller, e.g. via the ACF. Upon receiving the request signal 310, 312, the ACF may be configured to decide if the SE should be powered by the host controller or if the ACF powers the SE using the electromagnetic field. This decision may be based on the first time and the second delay time $t_{delay}$.

Figure 3B:
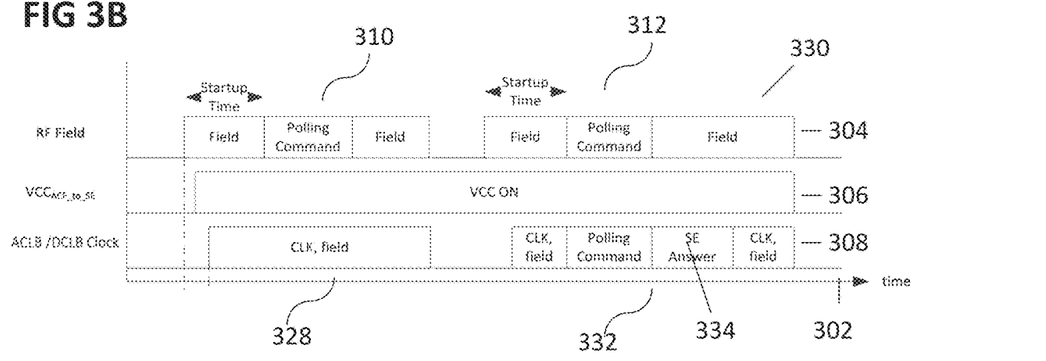

FIG. 3B schematically shows another signal timing of a boosted NFC device in a diagram 330.

FIG. 3B shows the diagram 330 similar to the diagram 300 of FIG. 3A, e.g. the same (category of) rows 304, 306, 308 and time axis 302. The ACF compares the delay time $t_{delay}$ of the SE with the startup time $t_{startup}$ of the reading device. In an embodiment the ACF may include a timer and may detect/measure the startup time $t_{startup}$ of the reading device.

In the case of FIG. 3B this comparison may have the result that a communication between the boosted NFC device and the reading device may not be ensured/guaranteed, e.g. the delay time $t_{delay}$ may have a longer duration than the startup time $t_{startup}$ ($t_{startup}<t_{delay}$). In this case, the ACF may not power/wake-up the SE for the first request signal 310 and/or may power/wake-up the SE for the first request signal 310 and may not forward the first request signal 310 to the SE and/or the ACF and/or may instruct the SE not to answer/process the first request signal 310. The SE may receive energy and stay at least partially active during the time duration between the first request signal 310 and the second request signal 312. Thus, the ACF and the SE may not cause or cause a smaller delay time $t_{delay}$ for the next request signal and by doing so, ensuring that the SE may receive and/or process the second (and other following) request signal 312. Instead of a first response signal, the ACLB/DCLB interface may just transfer energy received via the first request signal 310 to the SE with a signal 328 which may include one or more clock signals. In this example (and in other cases, too) the second response signal 332 may additionally include a SE answer data signal 334, which may include a processed information on the basis of the second request signal 312.

The ACF and/or the SE may be supplied with power by the host controller and/or the electromagnetic field of the first request signal 312. The SE may be powered by an energy storage, which may store energy received by the electromagnetic field during the first request signal 310 or the SE may be powered by the host controller, e.g. via the ACF.

Figure 3C:
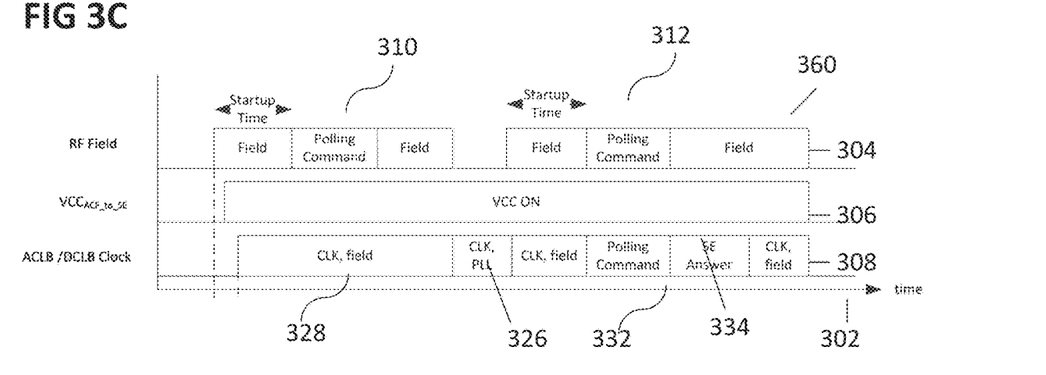

FIG. 3C schematically shows another signal timing of a boosted NFC device in a diagram 330.

FIG. 3C shows a diagram similar to FIG. 3B, e.g. the same (category of) rows 304, 306, 308 and time axis 302. In the time duration between the first request signal 310 and the second request signal 312, the ACF bypasses the gap of the clock signals with a PLL clock signal 326 (Phase Lock Loop) or another clock signal. Thus, it may be ensured that the SE and the ACF stay synchronous and/or active.

Figure 4A:
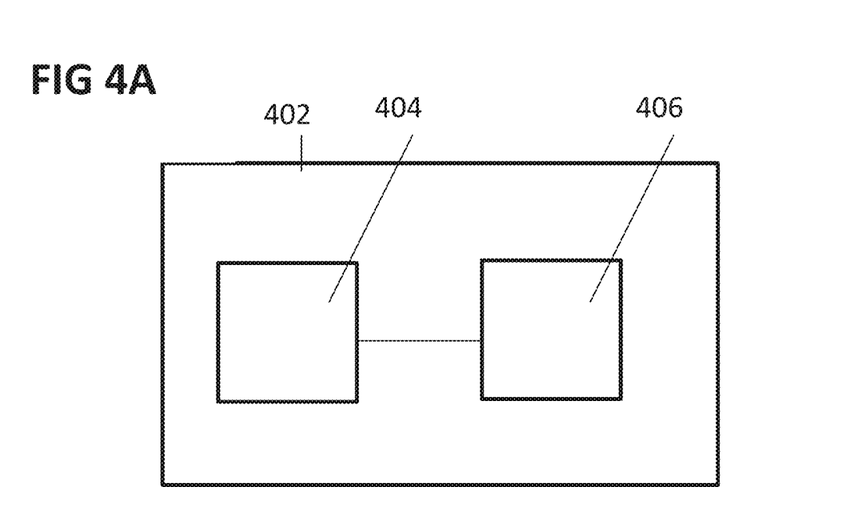
FIGS. 4A and 4B show communication devices with a boosted NFC device.

FIG. 4A schematically shows a communication device 402 including a boosted NFC device 404.

The communication device 402 may include a host controller 404 which is coupled to the boosted NFC device 406, which itself is part of the communication device 402. By way of example, the communication device 402 may be a mobile telephone, smartphone, smartband, smartwatch, PDA, tablet, tablet-computer, notebook, laptop, headset (e.g. for virtual reality/augmented reality applications) and/or a wearable (e.g. worn on a body of a person like electronic devices integrated into clothing/textiles).

Figure 4B:
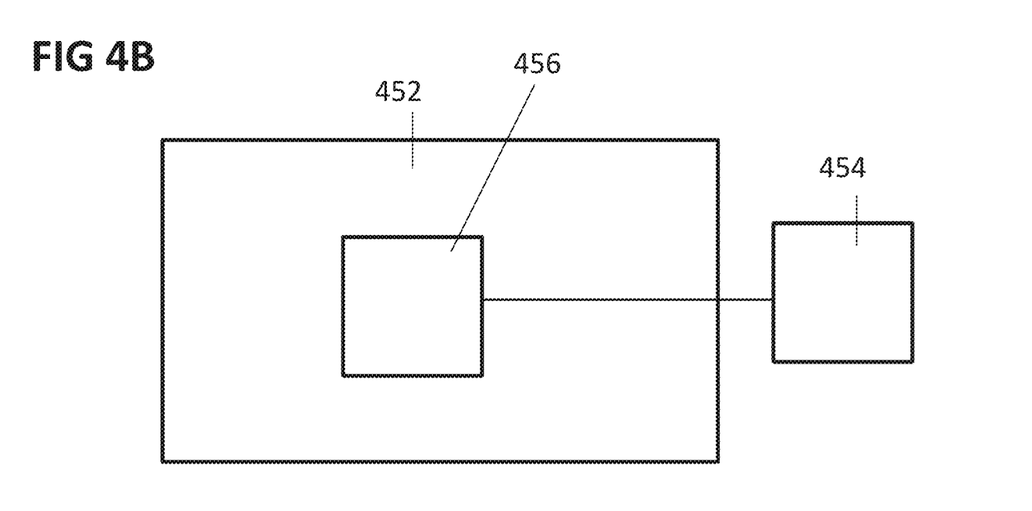

FIG. 4B schematically shows a communication device 452 coupled to a boosted NFC device 454.

The difference between the communication device 402 shown in FIG. 4A and the communication device 452 as shown in FIG. 4B is that the boosted NFC device 454 is not part of the communication device 452 but a, e.g. replaceable, module coupled to a host controller 456 of the communication device 452.

Figure 5A:
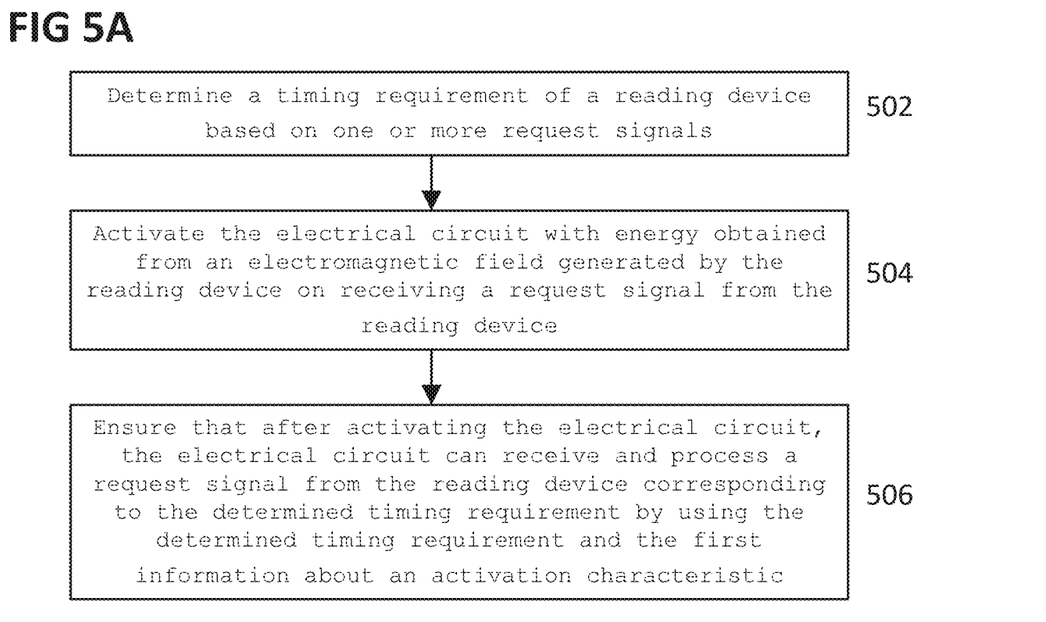
FIGS. 5A and 5B show embodiments of methods for operating a boosted NFC device.

FIG. 5A schematically shows an embodiment of a method for operating a boosted NFC device.

A boosted near field communication device includes an electronic circuit, a transceiver circuit, an interface coupling the electronic circuit with a host controller and a memory containing a first information about an activation characteristic of the electronic circuit.

A method for operating a boosted near field communication device may include, in 502, determining a timing requirement of a reading device based on one or more request signals and, in 504, activating the electronic circuit with energy obtained from an electromagnetic field generated by the reading device and/or from a battery on receiving a request signal from the reading device. The method may also include, in 506, ensuring that after activating the electronic circuit, the electronic circuit can receive and process a request signal from the reading device corresponding to the determined timing requirement by using the determined timing requirement and the first information about an activation characteristic.

Figure 5B:
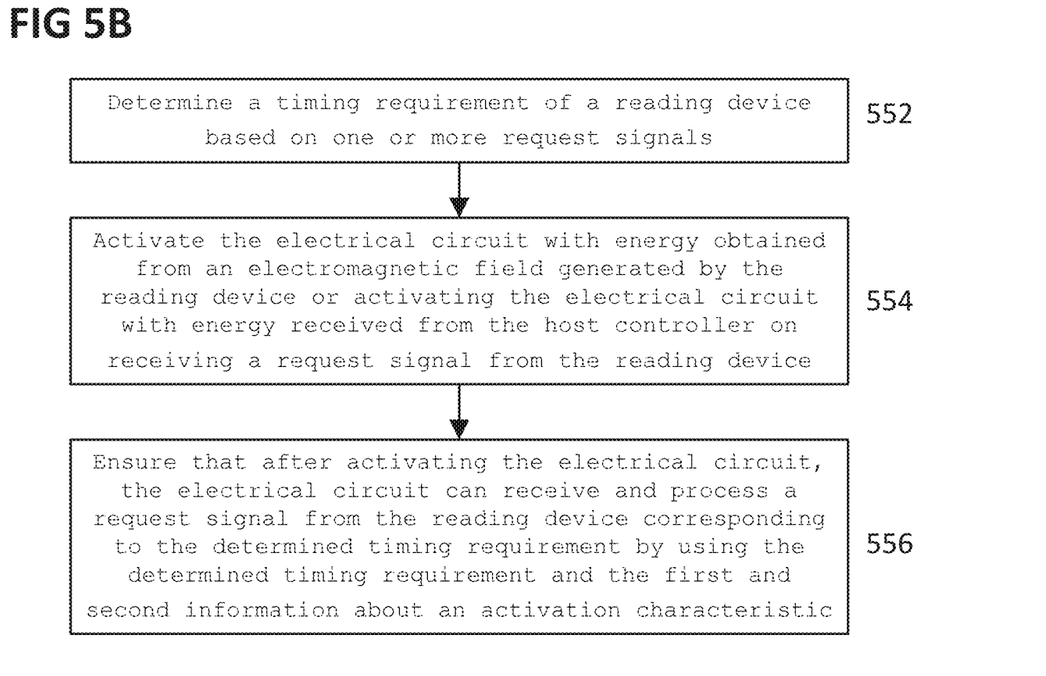

FIG. 5B schematically shows an embodiment of a method for operating a boosted NFC device.

According to one embodiment, a boosted near field communication device may include an electronic circuit, a transceiver circuit, an interface coupling the electronic circuit with a host controller and a memory containing a first and a second information about an activation characteristic of the electronic circuit.

A method for operating the boosted NFC device may include, in 552, determining a timing requirement of a reading device based on one or more request signals and, in 554, activating the electronic circuit with energy obtained from an electromagnetic field generated by the reading device and/or from a battery or activating the electronic circuit with energy received from the host controller on receiving a request signal from the reading device. The method may further include, in 556, ensuring that after activating the electronic circuit, the electronic circuit can receive and process a request signal from the reading device corresponding to the determined timing requirement by using the determined timing requirement and the first and second information about an activation characteristic.

An aspect of an embodiment may be seen in providing a boosted NFC device which includes an electronic circuit, a transceiver circuit and a memory. The boosted NFC device may receive one or more request signals from a reading device. The boosted NFC device may detect a timing requirement of the reading device on the basis of such a request signal. For instance, a timing requirement may be a duration between activating an electromagnetic field, which may serve as power supply for the electronic circuit, and sending a polling command. The memory may contain an information about the time duration it takes to activate the electronic circuit. The transceiver circuit may compare this information to the detected timing requirement of the reading device. Depending on this comparison, the electronic circuit may be activated to answer a request signal or a result of the comparison may be that the electronic circuit is not able to answer the request signal in time and is instructed to stay active and to answer a follow-up request signal from the reading device.

According to an embodiment a boosted NFC device includes an electronic circuit, a transceiver circuit, an interface coupling the electronic circuit with a host controller and a memory containing a first information about an activation characteristic of the electronic circuit. The transceiver circuit is configured to determine a timing requirement of a reading device based on one or more request signals. Furthermore, the transceiver circuit is configured to activate the electronic circuit with energy obtained from an electromagnetic field generated by the reading device and/or from a battery on receiving a request signal from the reading device. Moreover, the transceiver circuit is configured to ensure that after activating the electronic circuit, the electronic circuit is able to receive and process a request signal from the reading device corresponding to the determined timing requirement by using the determined timing requirement and the first information about an activation characteristic.

Near field communication (NFC) is an international standard for communication and devices. An example for an NFC application is an RFID tag (Radio frequency identification). Two or more NFC devices may exchange data and/or energy via an electromagnetic field or waves, e.g. via magnetic induction. For NFC communication, a typically used frequency is 13.56 MHz and a typical use distance between the two communication devices communicating with each other via NFC is about less than a meter or even centimeters.

Energy for powering an NFC device may be obtained by an electromagnetic field emitted by a reading device. Instead or additionally, a boosted NFC device, which is a category of NFC devices, may use energy from a storage, e.g. a battery provided in a host device like a smartphone or a smartwatch, to actively send a signal to a reading device. This may be implemented by coupling one or more components/circuits of the boosted NFC device to a host controller of another device (host) which includes an energy storage device. Boosted NFC technology may allow a faster communication (e.g. high rate of data transfer), a more reliable communication (less communication aborts) and a communication with a higher range compared to a non-boosted NFC device. Further, there may be a smaller space requirement for components like the antenna(e) of the boosted NFC device.

A boosted NFC device may operate in several modes like a normal or active mode or a sleep mode. In all modes, the boosted NFC device may consume energy from the energy storage device of its host device. To reduce the energy consumption, the boosted NFC device may include a transceiver circuit and an electronic circuit which may (partially or completely) be powered independently. The electronic circuit may consume more power than the transceiver circuit and may be in a sleep mode or powered off mode during a time in which it is not needed. The transceiver circuit may be configured to act like a frontend for the electronic circuit. The transceiver circuit may be configured to receive a signal and activate, e.g. wake up, start or power-up, the electronic circuit (or sending a signal to another circuit like the host controller to activate, e.g. wake up, start or power-up, the electronic circuit of the boosted NFC device).

Not all NFC devices may work according to a predefined communication standard, e.g. the communication standard ISO/IEC 14443. By way of example, timing requirements may not be met by a boosted NFC device. A timing requirement may be that a reading device may activate/emit an electromagnetic field but data may be transferred after a delay/waiting time. For example, a reading device may emit an electromagnetic field and may wait about 5 ms before it is sending a signal or data, e.g. a polling command. The NFC device may at least partially be powered by the electromagnetic field and may use the waiting time to activate (wake up, power-up and/or change an operating mode) one or more circuits, e.g. the electronic circuit, which may be able to receive and/or process the signal/data/command from the reading device. For example, not only does it take time to power-up the hardware of a circuit, but it may take a certain amount of time to start/initialize a software. If the waiting time is shorter than specified in a standard, e.g. because of the type of construction of a NFC device or a reading device or because the reading device may be damaged, a communication between a reading device and a NFC device may be slowed down or not possible. Furthermore, it may occur that the boosted NFC device itself need too much time to be powered-up so that it is not yet ready to receive and process radio signals at the time the reading device is transmitting the radio signals to be processed in accordance with the predefined timing, for example.

To prevent/circumvent such or other difficulties, a boosted NFC device may include a memory which may store an activation characteristic of the electronic circuit, e.g. an information about the time duration it takes to at least partially activate the electronic circuit. A transceiver circuit may be configured receive one or more request signals from a reading device. The transceiver circuit may determine a timing requirement of the reading device. By way of example, the transceiver circuit may determine a time duration between the activation of an electromagnetic field emitted by the reading device and the beginning of sending data/commands by the reading device. The transceiver circuit may activate the electronic circuit with energy obtained from the electromagnetic field and ensure that the electronic circuit may receive and/or process a (e.g. following) request signal. By way of example, the transceiver circuit may compare the information of the activation characteristic of the electronic circuit stored in the memory and the determined timing requirement of the reading device. As a result of the comparison, the transceiver circuit may activate the electronic circuit if the electronic circuit is able to receive and/or process a request signal from the reading device. As another result of the comparison, the transceiver circuit may activate the electronic circuit, e.g. with a delay, not to answer the request signal but to wait and answer a subsequent, e.g. a second, request signal, in other words, to ensure a stable bidirectional communication at a later time.

According to various embodiments, the electronic circuit includes a security circuit which is configured to process data according to cryptographic methods.

A security circuit, e.g. implemented as a secure element, may be configured to encrypt and decrypt data according to one or more cryptographic methods or cryptographic services, e.g. a symmetrical cryptographic method like AES or DES (using a symmetric key pair), an asymmetrical cryptographic method like RSA (using an asymmetric key pair), hashing-based based methods like MD2 or MD5 or methods for digital signatures, and the like. In various embodiments, the electronic circuit may be a secure element.

According to various embodiments, the interface includes at least one of the following: an interface according to ISO/IEC 7816, an interface according to Single Wire Protocol (SWP), and/or an interface according to Inter-Integrated Circuit (I²C).

According to various embodiments, the electronic circuit and/or the transceiver circuit are/is configured to at least partially be powered by energy received from the host controller after activating the electronic circuit.

A boosted NFC device or any of its components may receive energy from a host controller at least for a (e.g. predefined) period of time. The energy may be used to power one or more components, e.g. the electronic circuit and/or the transceiver circuit, or provide power additional to power received from other sources, e.g. received via the antenna(e).

The energy from the host controller may be used in several circumstances/applications or combinations of circumstances/applications. The energy may be used to provide power to the electronic circuit and/or the transceiver circuit during a sleep mode and/or during an operational/active mode of the respective component or the boosted NFC device. The energy may be used to power specific components within the electronic circuit and/or the transceiver circuit, e.g. a boosted NFC device may use energy received from the host controller for an antenna to boost/amplify signals sent and/or received via the antenna.

The energy may be used to supply additional energy if the amount of energy received via an electromagnetic field is not enough to power one or more components of the boosted NFC device. The energy may be used to keep the electronic circuit and/or the transceiver circuit active/in an operational mode in times no electromagnetic field, e.g. from a reading device, is present, e.g. in the period of time between two signals, e.g. request signals, from a reading device. The energy may be used to power the electronic circuit and/or the transceiver circuit for a communication of the host controller with the electronic circuit and/or the transceiver circuit, e.g. for transferring data between the electronic circuit and/or the transceiver circuit with the host controller and/or a host coupled to the host controller. The energy may also be used to actively search a NFC device or communicate, e.g. transfer data and/or energy, from or to another NFC device.

According to various embodiments, a boosted NFC device includes a detection circuit which is configured to determine an information about an activation characteristic of the electronic circuit and to save the information in the memory.

A detection circuit may be or include one or more sensors or one or more circuits which may act sensor-like to detect or estimate an information about an activation characteristic. The detection circuit may include a timer. This information may include several information/data, e.g. information about an operational mode or state, the concerned component and one or more time durations. The detection circuit may be or include a component of the electronic circuit and/or the transceiver circuit or at least partially be or include a separate component of the boosted NFC device. The detection circuit may be configured to acquire a first and, in various embodiments, a second information. In various embodiments, the detection circuit may be configured to acquire more information beyond the first information and the second information. The memory may include a default information.

According to various embodiments, the memory includes a second information about an activation characteristic. The transceiver circuit may be configured to activate the electronic circuit with energy obtained from the host controller, optionally from a battery of a host system including the host controller, on receiving a request signal from the reading device and ensure that after having activated the electronic circuit, the electronic circuit is able to receive and process a request signal from the reading device corresponding to the determined timing requirement by using the determined timing requirement and the first information and the second information about an activation characteristic.

The boosted NFC device or one or more of its components like the electronic circuit and/or the transceiver circuit may be powered by energy obtained from an electromagnetic field from a reading device, e.g. in a first mode, and powered by energy obtained from the host controller, e.g. in a second mode. The electronic circuit may have different activation characteristics depending on the energy source, e.g. different time durations for starting up and/or waking up from a sleep mode. The memory may include information about the different activation characteristics. The different activation characteristics may be obtained by a detection circuit. The transceiver circuit may be configured to compare an obtained timing requirement of a reading device with the (information of) different activation characteristics. Based on this comparison the transceiver circuit may be configured to activate or wake up the electronic circuit either by energy supplied via the electromagnetic field of the reading device or by energy supplied from the host controller. The comparison may involve or take into consideration if the amount of energy supplied by the reading device is sufficient to power the electronic circuit. Thus, it can be ensured that the electronic circuit may be adapted to the timing requirement(s) of a reading device and may be adapted to the power supplied by a reading device.

According to various embodiments, the electronic circuit is configured to operate in a normal operation mode and a sleep mode.

According to various embodiments, the boosted NFC device is configured to supply the electronic circuit with a supply voltage until receiving a request signal which the electronic circuit is able to receive and process.

According to various embodiments, the transceiver circuit includes an Automatic Contactless Frontend (ACF) circuit.

An ACF circuit may be configured to automatically wake up or power or regulate/control power for the electronic circuit. Alternatively or additionally, the transceiver circuit may be a Contactless Frontend (CLF).

According to various embodiments, the electronic circuit includes a secure element.

According to various embodiments, the electronic circuit includes a secure element and the secure element includes one or more of the following circuits: a subscriber identity module (SIM), a universal subscriber identity module (USIM), a universal integrated circuit card (UICC), an embedded subscriber identity module (eSIM), and/or an embedded secure module. An embedded secure module (which may also be referred to as an embedded secure element is a chip which is directly bonded on a device mother board. Unlike other form factors, an embedded secure module does not allow interchanging or extracting the secure element, it is permanently attached to a device.

According to various embodiments, a communication device may include a host controller and a boosted NFC device.

According to various embodiments, a communication device may include at least one sensor and/or actuator coupled the host controller.

According to various embodiments, a communication device may include a display device coupled to the host controller.

According to various embodiments, a communication device may include an energy storage coupled to the host controller.

According to various embodiments, a communication device may be a wearable device.

According to various embodiments, a communication device may be configured to be worn on a body of a person.

According to various embodiments, a communication device may include a wrist watch.

According to various embodiments, a boosted near field communication device includes an electronic circuit, a transceiver circuit, an interface coupling the electronic circuit with a host controller and a memory containing a first information about an activation characteristic of the electronic circuit. A method for operating a boosted near field communication device may include determining a timing requirement of a reading device based on one or more request signals and activating the electronic circuit with energy obtained from an electromagnetic field generated by the reading device and/or from a battery on receiving a request signal from the reading device. The method may also include ensuring that after having activated the electronic circuit, the electronic circuit can receive and process a request signal from the reading device corresponding to the determined timing requirement by using the determined timing requirement and the first information about an activation characteristic.

According to various embodiments, a boosted near field communication device may include an electronic circuit, a transceiver circuit, an interface coupling the electronic circuit with a host controller and a memory containing a first and a second information about an activation characteristic of the electronic circuit.

A method for operating the boosted NFC device may include determining a timing requirement of a reading device based on one or more request signals and activating the electronic circuit with energy obtained from an electromagnetic field generated by the reading device and/or from a battery or activating the electronic circuit with energy received from the host controller on receiving a request signal from the reading device. The method may further include ensuring that after having activated the electronic circuit, the electronic circuit can receive and process a request signal from the reading device corresponding to the determined timing requirement by using the determined timing requirement and the first and second information about an activation characteristic.

According to various embodiments, a method for operating a boosted NCF device may be applied to a boosted NFC device. The electronic circuit and/or the transceiver circuit is/are configured to at least partially be powered by energy received from the host controller after activating the electronic circuit.

According to various embodiments, a method for operating a boosted NCF device may further include detecting at least one information about an activation characteristic of the electronic circuit and saving the at least one information in the memory.

According to various embodiments, a method for operating a boosted NCF device may further include supplying the electronic circuit with a supply voltage until receiving a request signal which the electronic circuit is able to receive and process.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A boosted near field communication device, comprising:
    an electronic circuit;
    a transceiver circuit;
    an interface coupling the electronic circuit with a host controller; and
    a memory containing a first information about an activation characteristic of the electronic circuit, wherein the activation characteristic is a time duration for one or more components of the boosted near field communication device to start-up or wake-up;
wherein the transceiver circuit is configured to
determine a timing requirement of a reading device based on one or more request signals,
activate the electronic circuit with energy obtained at least one of from an electromagnetic field generated by the reading device or from a battery on receiving a request signal from the reading device, and
ensure that after activating the electronic circuit, the electronic circuit can receive and process a request signal from the reading device corresponding to the determined timing requirement by using the determined timing requirement and the first information about an activation characteristic; and
wherein the timing requirement of the reading device is determined as a duration between an activation of an electromagnetic field and a sending of a polling command.

2. The boosted near field communication device of claim 1,
wherein the electronic circuit comprises a security circuit which is configured to process data according to cryptographic methods.

3. The boosted near field communication device of claim 1,
wherein the interface comprises at least one of the following:
an interface according to ISO/IEC 7816;
an interface according to Single Wire Protocol; and
an interface according to Inter-Integrated Circuit.

4. The boosted near field communication device of claim 1,
wherein the electronic circuit and/or the transceiver circuit is/are configured to at least partially be powered by energy received from the host controller after activating the electronic circuit.

5. The boosted near field communication device of claim 1, further comprising:
a detection circuit which is configured to determine an information about an activation characteristic of the electronic circuit and to save the information in the memory.

6. The boosted near field communication device of claim 1,
wherein the memory contains a second information about a activation characteristic;
wherein the transceiver circuit is configured to:
activate the electronic circuit with energy obtained from the host controller on receiving a request signal from the reading device,
ensure that after activating the electronic circuit, the electronic circuit can receive and process a request signal from the reading device corresponding to the determined timing requirement by using the determined timing requirement and the first and second information about an activation characteristic.

7. The boosted near field communication device of claim 6,
wherein the electronic circuit is activated further dependent on timing information, optionally of a clock signal which is provided by a Phase Lock Loop (PLL) circuit of the boosted near field communication device.

8. The boosted near field communication device of claim 1,
wherein the electronic circuit is configured to operate in a normal operation mode and a sleep mode.

9. The boosted near field communication device of claim 1,
wherein the boosted near field communication device is configured to supply the electronic circuit with a supply voltage until receiving a request signal which the electronic circuit is able to receive and process.

10. The boosted near field communication device of claim 1,
wherein the electronic circuit comprises a secure element.

11. The boosted near field communication device of claim 10,
wherein the secure element comprises one or more of the following circuits:
a subscriber identity module;
an universal subscriber identity module;
an universal integrated circuit card;
an embedded subscriber identity module; and
an embedded secure module.

12. A communication device, comprising:
a host controller; and
a boosted near field communication device, comprising:
an electronic circuit;
a transceiver circuit;
an interface coupling the electronic circuit with a host controller;
a memory containing a first information about an activation characteristic of the electronic circuit;
wherein the transceiver circuit is configured to
determine a timing requirement of a reading device based on one or more request signals,
activate the electronic circuit with energy obtained at least one of from an electromagnetic field generated by the reading device or from a battery on receiving a request signal from the reading device, and
ensure that after activating the electronic circuit, the electronic circuit can receive and process a request signal from the reading device corresponding to the determined timing requirement by using the determined timing requirement and the first information about an activation characteristic;
wherein the boosted near field communication device is coupled to the host controller;
wherein the activation characteristic is a time duration for one or more components of the boosted near field communication device to start-up or wake-up; and
wherein the timing requirement of the reading device is determined as a duration between an activation of an electromagnetic field and a sending of a polling command.

13. The communication device of claim 12, further comprising:
at least one of at least one sensor or an actuator coupled the host controller.

14. The communication device of claim 12, further comprising:
a display device coupled to the host controller.

15. The communication device of claim 12, further comprising:
an energy storage coupled to the host controller.

16. The communication device of claim 12,
wherein the communication device is a wearable device.

17. The communication device of claim 16,
wherein the communication device is configured to be worn on a body of a person.

18. The communication device of claim 16, further comprising:
a wrist watch.

19. A method for operating a boosted near field communication device,
the boosted near field communication device comprising:
an electronic circuit,
a transceiver circuit,
an interface coupling the electronic circuit with a host controller,
a memory containing a first information about an activation characteristic of the electronic circuit, wherein the activation characteristic is a time duration for one or more components of the boosted near field communication device to start-up or wake-up,
the method comprising:
determining a timing requirement of a reading device based on one or more request signals,
activating the electronic circuit with energy obtained at least one of from an electromagnetic field generated by the reading device or from a battery on receiving a request signal from the reading device, and
ensuring that after activating the electronic circuit, the electronic circuit can receive and process a request signal from the reading device corresponding to the determined timing requirement by using the determined timing requirement and the first information about an activation characteristic;
wherein the timing requirement of the reading device is determined as a duration between an activation of an electromagnetic field and a sending of a polling command.

20. A method for operating a boosted near field communication device,
the boosted near field communication device comprising:
an electronic circuit,
a transceiver circuit,
an interface coupling the electronic circuit with a host controller,
a memory containing a first and a second information about an activation characteristic of the electronic circuit, wherein the activation characteristic is a time duration for one or more components of the boosted near field communication device to start-up or wake-up,
the method comprising:
determining a timing requirement of a reading device based on one or more request signals,
activating the electronic circuit with energy obtained from an electromagnetic field generated by the reading device or activating the electronic circuit with energy received from the host controller on receiving a request signal from the reading device, and
ensuring that after activating the electronic circuit, the electronic circuit can receive and process a request signal from the reading device corresponding to the determined timing requirement by using the determined timing requirement and the first and second information about an activation characteristic; and
wherein the timing requirement of the reading device is determined as a duration between an activation of an electromagnetic field and a sending of a polling command.

* * * * *